United States Patent
Taylor (10) Patent No.: US 6,843,265 B2
(45) Date of Patent: Jan. 18, 2005

(54) PRESSURE RELIEF SYSTEM WITH SUPPLY ACTIVATED VALVE

(75) Inventor: Julian S. Taylor, Oklahoma City, OK (US)

(73) Assignee: Taylor Innovations, L.L.C., Oklahoma City, OK (US)

(*) Notice: Subject to any disclaimer, the term of this patent is extended or adjusted under 35 U.S.C. 154(b) by 221 days.

(21) Appl. No.: 10/123,770

(22) Filed: Apr. 16, 2002

(65) Prior Publication Data

US 2003/0192588 A1 Oct. 16, 2003

(51) Int. Cl.[7] .............................................. F16K 17/14
(52) U.S. Cl. ........................ 137/70; 137/488; 137/492
(58) Field of Search .............................. 137/68.11, 70, 137/71, 488, 492

(56) References Cited

U.S. PATENT DOCUMENTS

| | | | |
|---|---|---|---|
| 310,031 A | * | 12/1884 | Castelnau et al. .......... 137/494 |
| 2,082,940 A | * | 6/1937 | Brisbane et al. ............ 137/488 |
| 2,296,568 A | * | 9/1942 | Peacock ..................... 137/488 |
| 3,542,052 A | | 11/1970 | Irwin |
| 3,730,214 A | * | 5/1973 | Brumm ....................... 137/488 |
| 4,564,169 A | * | 1/1986 | Nordlund .................... 251/63.4 |
| 4,724,857 A | | 2/1988 | Taylor |
| 4,949,936 A | * | 8/1990 | Messina ..................... 251/58 |
| 5,067,511 A | | 11/1991 | Taylor |
| 5,146,942 A | | 9/1992 | Taylor |
| 5,297,575 A | | 3/1994 | Taylor |
| 5,318,060 A | | 6/1994 | Taylor |
| 5,325,888 A | * | 7/1994 | Stary ......................... 251/58 |
| 5,433,239 A | | 7/1995 | Taylor |
| 5,462,086 A | | 10/1995 | Taylor et al. |
| 5,575,306 A | | 11/1996 | Taylor |
| 5,685,329 A | | 11/1997 | Taylor |
| 6,155,284 A | | 12/2000 | Scantlin |
| 6,325,088 B1 | | 12/2001 | Scantlin |

FOREIGN PATENT DOCUMENTS

| | | |
|---|---|---|
| GB | 2196096 A | 4/1988 |
| GB | 2247300 A | 2/1992 |

* cited by examiner

*Primary Examiner*—John Rivell
(74) *Attorney, Agent, or Firm*—Fellers, Snider, et al.

(57) ABSTRACT

A pressure relief system for detecting and abating an overpressure in a pressurized fluid. The system includes a pressure response assembly that has a pressure responsive member, such as a buckling pin, configured to buckle when a predetermined force is applied to the member. When the buckling pin buckles, a piston slides to expose an inlet to a communication path to an actuator assembly. The actuator assembly includes a pair of sliders that move from a retracted position to an extended position when pressurized fluid enters an actuator assembly housing. The sliders have a rack that turns a pinion when the sliders move from the retracted position to the extended position. The pinion is rigidly attached to a rotatable actuator shaft. Rotation of the actuator shaft causes a valve assembly to open or close to direct the pressurized fluid through an overpressure path.

20 Claims, 5 Drawing Sheets

PRESSURE RELIEF SYSTEM WITH SUPPLY ACTIVATED VALVE

FIELD OF THE INVENTION

The present invention relates generally to pressurized fluid systems and more particularly, but not by way of limitation, to a pressure relief system which uses supply pressure to activate an actuator assembly to open or close a valve assembly.

BACKGROUND

Pressurized fluid systems are typically provided with pressure relief capabilities to prevent the possibility of injury to humans and damage to equipment in the event of an overpressure situation. Such pressure relief systems often use a pressure responsive member that mechanically fails when subjected to a large increase in fluid pressure.

A particularly advantageous pressure relief system uses a buckling pin arrangement such as taught by U.S. Pat. No. 4,724,857 issued to Taylor. In such a system, the pin is placed under compressive load along an axial length of the pin by the pressure of the fluid. A sufficient increase in fluid pressure above a nominal operational level causes the pin to buckle, or collapse, allowing a plunger or other mechanism to move to a position where a bypass path can be established to direct the fluid to reduce the pressure to a safe operational level.

A valve can be advantageously configured to open or close in response to the collapse of a buckling pin, such as disclosed in copending U.S. patent application Ser. No. 10/020,611 filed by Taylor. Such a system uses a rotary actuator assembly with a rack and pinion arrangement. Lateral movement of the rack in response to a collapse of the pin induces rotation of the pinion. The pinion is coupled to the bypass valve to induce the desired rotary motion to open or close the valve.

While operable, under certain circumstances system forces can undesirably affect a threshold pressure level at which the pressure responsive member begins to fail. For example, friction forces and fluidic pressure can tend to offset the compressive load upon a buckling pin if the pin actuation and the valve are directly coupled.

There is therefore a continued need for improvements in the art to increase the accuracy and repeatability of pressure relief systems, and it is to such improvements that the present invention is directed.

SUMMARY OF THE INVENTION

A pressure relief system is provided to detect and abate an overpressure situation in a pressurized fluid. In accordance with preferred embodiments, a pressure response assembly is provided with a pressure responsive member such as a buckling pin that is configured to mechanically fail when a predetermined force is applied to the member. The pressure response assembly also includes a piston slidable in a housing. When the buckling pin fails, the piston slides to expose an inlet of communication path to the pressurized fluid.

The pressurized fluid flows through the communication path to an actuator assembly. In one preferred embodiment, the actuator assembly includes a pair of sliders (pistons) that slide in an actuator assembly housing. The actuator assembly also includes a pinion (spline gear) mounted to an actuator shaft adjacent each slider. The pinion engages a rack of each slider. When the pressurized fluid enters the actuator assembly, the pressurized fluid moves each slider from a retracted position to an extended position. When the sliders move, the rack rotates the pinion, which in turn rotates the actuator shaft. In another preferred embodiment, the actuator assembly includes a single slider (piston) which moves using a rack and pinion arrangement to rotate the actuator shaft.

The actuator shaft is coupled to a valve shaft. Rotation of the valve shaft operates to open or close a valve assembly. The valve assembly establishes an overpressure path for the pressurized fluid when the valve shaft is rotated by a selected amount (such as a quarter-turn). The overpressure path can comprise a bypass path (redirection of flow) or a shutdown path (interruption of flow).

Because of the isolation of the pressure response assembly from the actuator assembly, forces associated with the valve assembly are also isolated from the actuator assembly prior to and during the initial stages of mechanical failure, allowing the threshold pressure at which mechanical failure of the member begins to be accurately controlled.

These and various other features and advantages which characterize the claimed invention will become apparent upon reading the following detailed description and upon reviewing the associated drawings.

DETAILED DESCRIPTION

Figure 1:
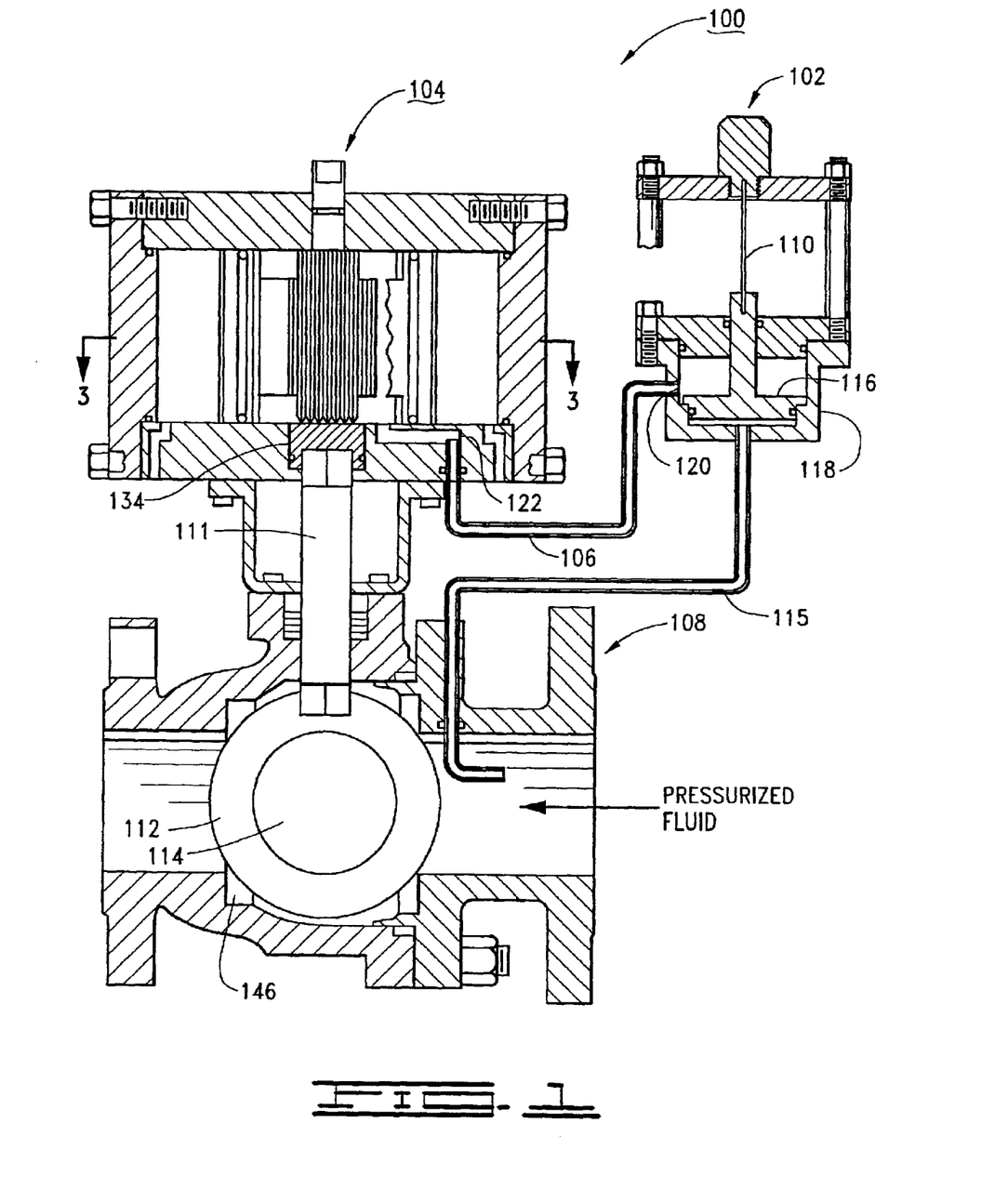
FIG. 1 is a partial cross-sectional view of a pressure relief system constructed in accordance with preferred embodiments of the present invention, with the system generally including a pressure response assembly, an actuator assembly, a clutch mechanism and a bypass valve assembly.

Reference is now made to FIG. 1 which shows a pressure relief system 100 constructed in accordance with preferred embodiments of the present invention. The pressure relief system 100 ("system") is preferably used as part of a larger pressurized fluid system in which a pressurized fluid is transported. The pressure relief system 100 is used to detect an overpressure situation with the fluid and to provide an emergency overpressure path for the fluid to reduce the possibility of injury to humans and damage to equipment.

Figure 2:
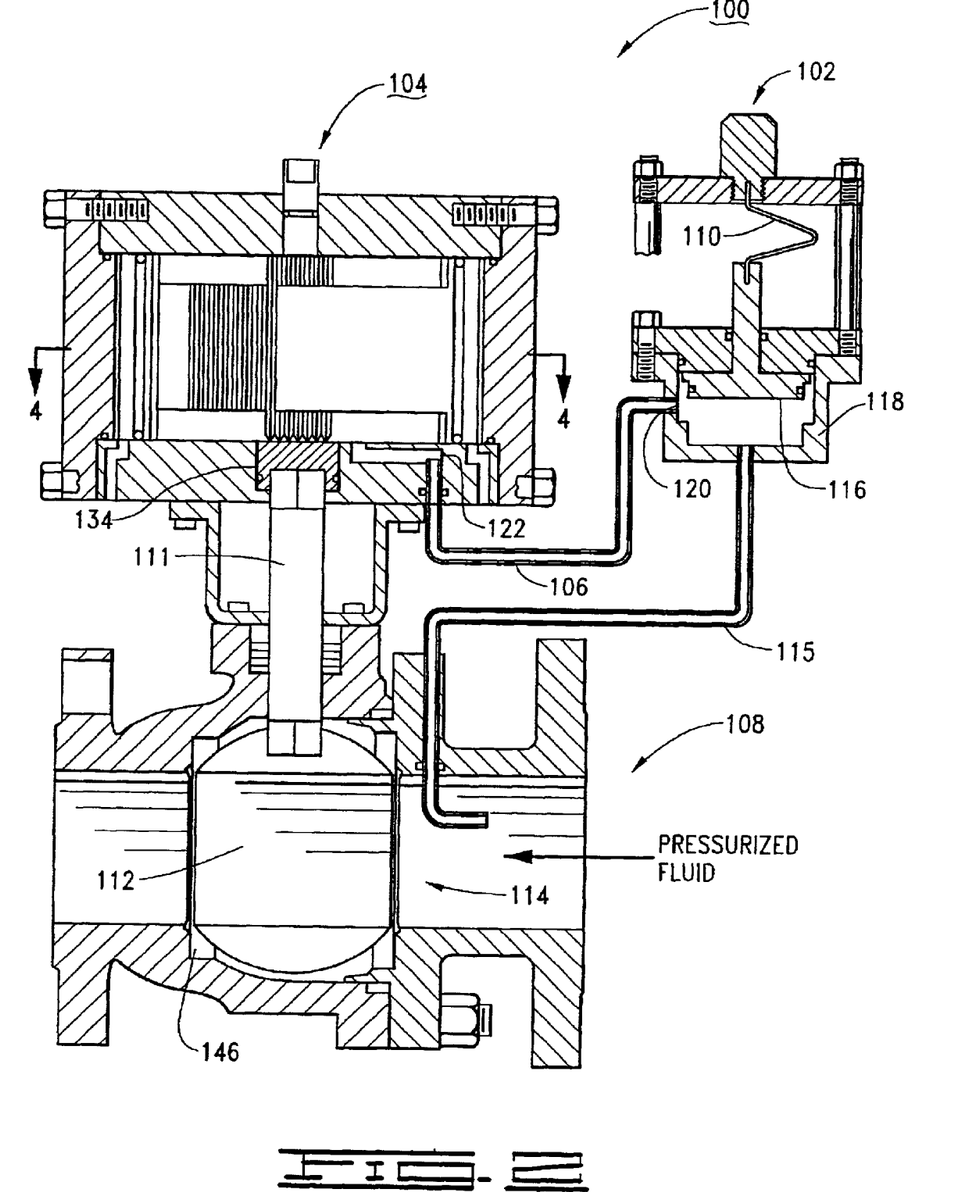
FIG. 2 shows the system of FIG. 1 with the valve assembly in the open position to represent the response of the system to an overpressure situation.

The system 100 is shown to generally include a pressure response assembly 102, an actuator assembly 104, a communication path 106 and a bypass valve assembly 108. The pressure response assembly 102 is shown to preferably comprise a buckling pin 110, although it is contemplated that other pressure responsive members can be used such as a shear pin or a frangible disk. The valve assembly 108 is shown to comprise a valve shaft 111 and a ball valve 112 with a central port 114, but other valve configurations can readily be used including a butterfly valve or a plug-type valve. The ball valve 112 is configured to be normally closed (NC), so that the system 100 operates to open the ball valve 112 to provide a bypass path for the fluid (as shown in FIG. 2). Alternatively, the ball valve 112 can be configured to be normally open (NO) so that the system operates to close the ball valve 112 to establish a shutoff path.

The communication path 106 provides pressure communication from the pressure response assembly 102 to the actuator assembly 104 during an overpressure condition. As explained in greater detail below, pressurized fluid at a normal operational pressure is introduced into the pressure response assembly 102 such as through conduit 115. The fluid pressure applies an axial compressive force to the buckling pin 110 via piston 116. The piston 116 is configured to slide within a housing 118.

At such time that the pressure of the fluid rises above a selected level greater than the normal operational pressure, the axial force exerted upon the buckling pin 110 will exceed the buckling limit of the pin 110 and the pin 110 will buckle (mechanically fail), as shown in FIG. 2. The buckling limit depends on the modulus of elasticity of the material of the buckling pin 110 and the particular geometry for the buckling pin 110. When the buckling pin 110 fails, the piston 116 moves in the housing 118 to expose the communication path inlet 120 to the fluid. At this point the fluid flows through the communication path 106 and to the actuator assembly 104 via an actuator assembly inlet 122.

Figure 3:
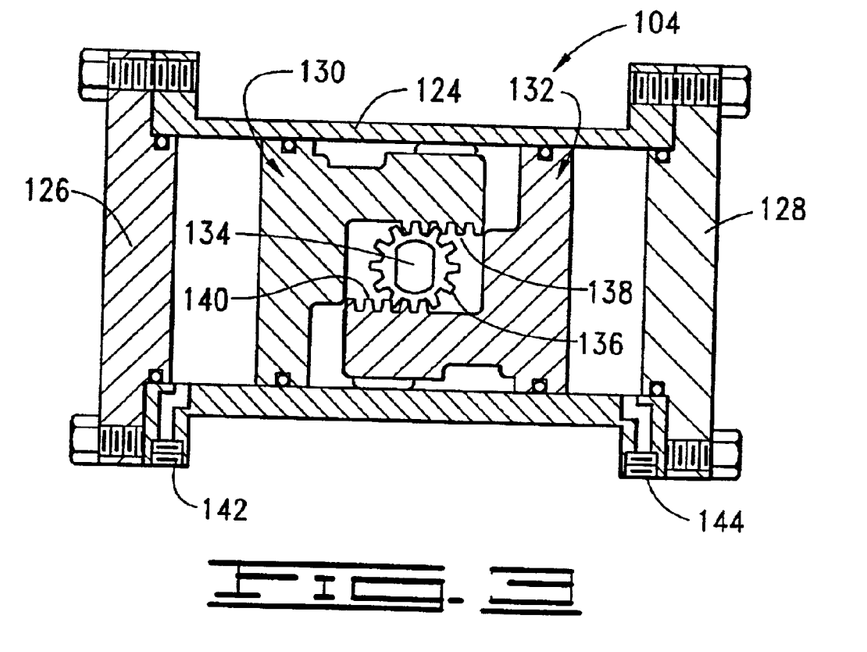
FIG. 3 is a cross-sectional view of the actuator assembly of the system of FIG. 1 in accordance with a preferred embodiment, with the actuator assembly placed in a normal, retracted position during steady state operation.
Figure 4:
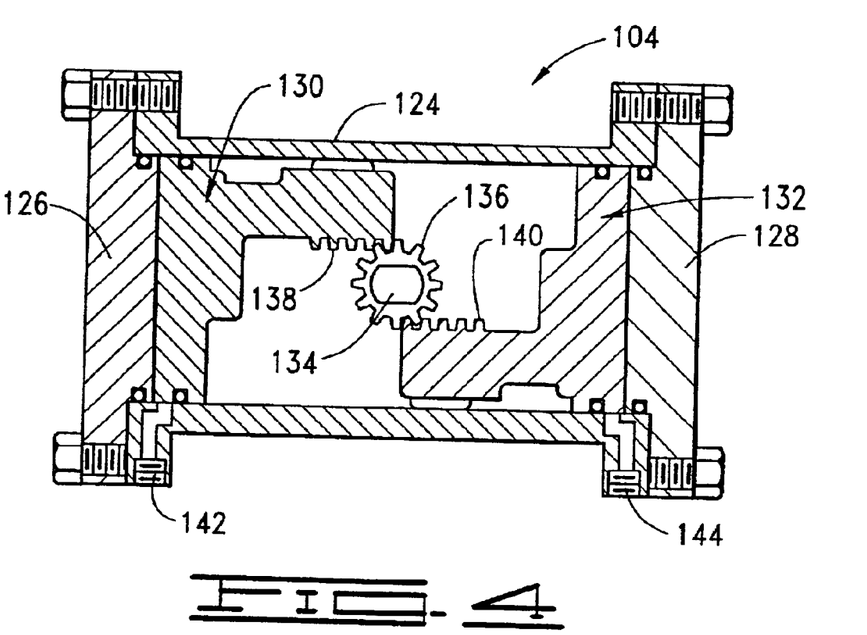
FIG. 4 shows the actuator assembly of FIG. 3 in an extended position.

FIGS. 3 and 4 illustrate a first preferred construction of the actuator assembly 104. A body portion 124 cooperates with flanges 126, 128 to provide a sealed actuator assembly housing. Pressurized fluid enters the actuator assembly housing between a pair of actuator sliders 130, 132 via the actuator assembly inlet 122 (shown in FIG. 1). The sliders 130, 132 are disposed within the housing and are configured for movement toward opposing ends of the housing. An actuator shaft 134 is transversely mounted by the body portion 116 and supports a pinion 136 (elongated rotary gear) which engages racks 138, 140 (teeth) in the respective sliders 130, 132.

When the pressurized fluid enters the actuator assembly housing, the pressure of the fluid causes the sliders 130, 132 to move linearly apart. The sliders 130, 132 move from a retracted position, shown in FIG. 3, to an extended position, shown in FIG. 4. The linear movement of the sliders 130, 132 induces torque in the actuator shaft 134 as a result of engagement of the racks 138, 140 and the pinion 136. The actuator shaft 134 is coupled to the valve shaft 111, so that the valve assembly 108 is opened or closed when the actuator shaft 134 rotates. Vent ports 142, 144 allow atmospheric air within the housing to escape as the actuator assembly 104 moves to the extended position.

In general, valve assemblies such as shown at 108 are not frictionless systems. In order to move the valve assembly 108 between the open position and the closed position, significant amounts of force may be required to overcome reactive forces, such as stiction force (i.e., force resisting initial movement of the ball valve 112) and friction force (i.e., force resisting continued movement of the ball valve 112 after the initial movement). One source of these reactive forces is the seal assemblies (such as 146). The seal assemblies 146 are required to maintain an adequate seal against the fluid pressure about the ball valve 112.

Another source of reactive forces is the pressure of the fluid upon the various surfaces of the ball valve 112 as the ball valve 112 is rotated. The ball valve 112 variably restricts a flow stream of the fluid. The pressure of the fluid varies as the ball valve 112 is placed at intermediate positions between the open and closed positions can impart significant resistance to the rotation of the ball valve 112. Such forces are also typically present in other valve configurations (particularly butterfly valves) and will tend to increase at higher operational pressures. Thus, making the pressure response assembly 102 initially independent from the actuator assembly 104, which operates the ball valve 112, advantageously prevents the stiction and friction forces of the valve assembly 108 from affecting the operation of the pressure response assembly 102.

Figure 5:
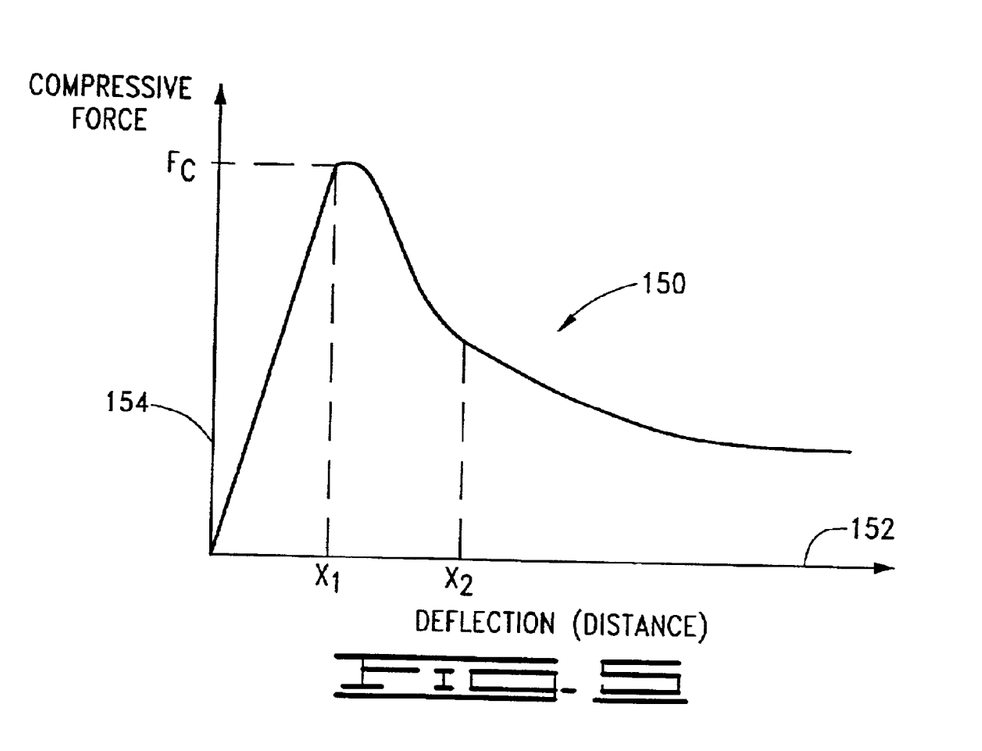
FIG. 5 is a graphical illustration of a force versus deflection curve to generally illustrate force required to deflect and ultimately collapse a buckling pin of the pressure response assembly of FIG. 1.

Another related advantage to making the pressure response assembly 102 independent from the actuator assembly 104 relates to the manner in which a typical buckling pin collapses. FIG. 5 provides a generalized graphical representation of a buckling pin deflection curve 150 plotted against a deflection distance x-axis 152 and a compressive force magnitude y-axis 154. Forces below a critical force Fc allow the pin 110 to remain within its elastic limit; thus, increases in compressive force up to the critical force Fc will impart a slight bowing to the pin 110, but a relaxation of the compressive force will allow the pin 110 to return to the original straight configuration.

However, once the critical force Fc is reached (i.e., axial deflection reaches a distance X1), the pin 110 begins to buckle. The amount of force thereafter required to continue buckling of the pin is not constant, but drops off rapidly as shown by curve 150. Hence, instituting a short time delay before engagement of the valve assembly 108 upon pin failure advantageously allows the pressurized fluid to initiate compression of the pin 110 without being hindered by opposing forces from the valve assembly 108. This time delay is inherent in the system because it takes some finite time for the piston 116 to slide to expose the communication path 106 to the pressurized fluid.

Figure 6:
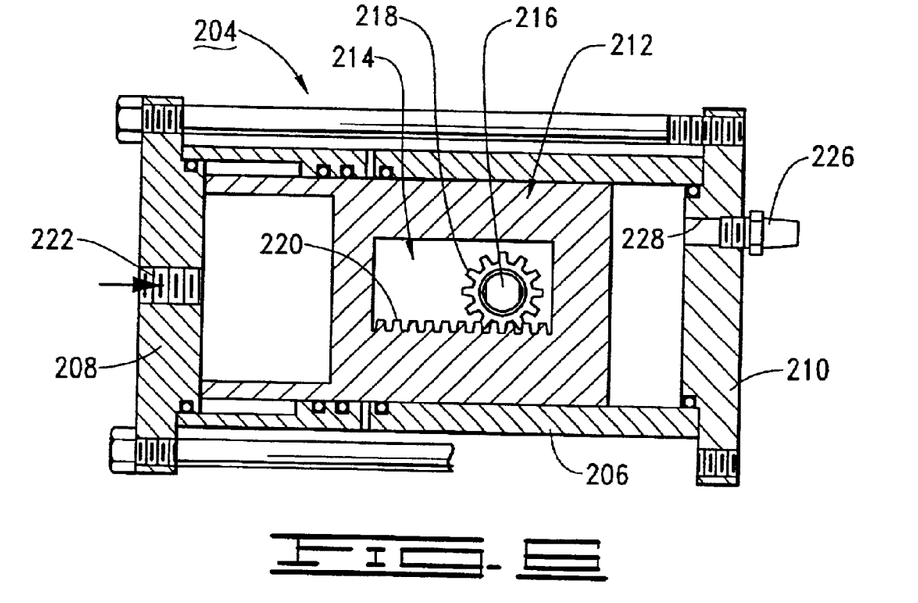
FIG. 6 shows an alternate preferred construction for the actuator assembly of FIG. 1 in a retracted position.
Figure 7:
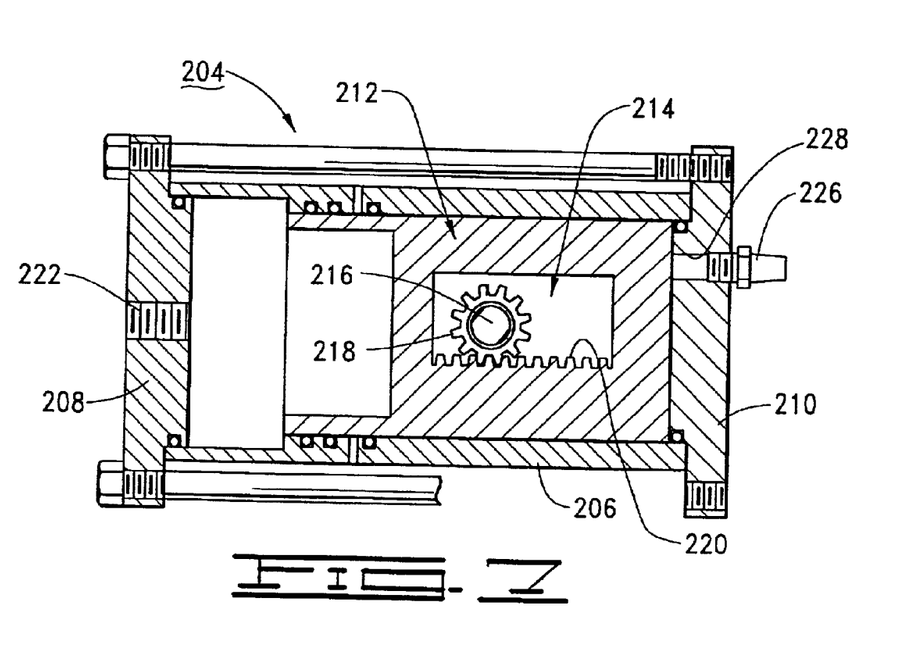
FIG. 7 shows an alternate preferred construction for the actuator assembly of FIG. 1 in an extended position.

FIGS. 6 and 7 illustrate an alternative actuator assembly 204 that can be advantageously used in lieu of the actuator assembly 104 discussed above. The actuator assembly 204 includes a body portion 206 that cooperates with flanges 208, 210 to form a sealed housing. A single plunger-type slider 212 is arranged for sliding movement within the body 206. An interior chamber 214 of the slider 212 accommodates a transversally mounted actuator shaft 216 upon which a pinion 218 is mounted. A rack 220 of the piston 212 engages the pinion 218 as shown.

Pressurized fluid is introduced into the housing via port 222 and bears against the slider 212. A bleed valve 226 within port 228 allows atmospheric air within the housing to escape upon movement of the piston 218. FIG. 6 shows the slider 212 in a retracted position and FIG. 7 shows the slider 212 in an extended position. In moving from the retracted position to the extended position, the rack 218 rotates the actuator shaft 216, which is coupled to a valve shaft 111 (shown in FIG. 1), to open or close the valve assembly 112.

The actuator assembly 204 is particularly useful in environments where dirty fluids (i.e. corrosive or otherwise contaminating fluids) are used, since the pressurized fluid does not come into contact with the rack 220 and pinion 218 and thus does not interfere with the operation or reliability of the system 100 over time.

It will now be understood that the present invention is generally directed to a pressure relief system for detecting an overpressure situation in a pressurized fluid. In accordance with preferred embodiments, the pressure relief system includes a rotatable actuator shaft (such as shaft 134) coupled to a valve shaft (such as shaft 111); a pressure response member (such as buckling pin 110) configured to mechanically fail when a predetermined force is applied to the pressure responsive member; a first means for applying a force to the pressure responsive member in response to a pressure of the pressurized fluid (such as pressure response assembly 102); second means for rotating the valve shaft when the pressure responsive member mechanically fails (such as actuator assemblies 104 and 204); and a third means for communicating to the second means when the pressure responsive member mechanically fails (such as communication path 106).

For purposes of the appended claims, mechanical failure will be understood as describing, for example, the buckling of a buckling pin such as 110, the shearing of a shear pin, or the bursting of a disc membrane. Overpressure path will be understood to describe a redirection of the flow of the pressurized fluid, such as by a bypass path (as shown in FIG. 2) or a shutdown (interruption) in the original flow. Other piston-shaft coupling arrangements besides a rack and pinion arrangement to generate a torque are readily contemplated and are well within the ability of those skilled in the art to implement, such as configurations using belts, springs, chain drives, or linkages.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A pressure relief system for detecting and abating an overpressure condition in a pressurized fluid, comprising:
   a pressure responsive member configured to mechanically fail when a predetermined force is applied to the pressure reponsive member;
   a fluidic communication path;
   first means, coupled to the pressure responsive member and the communication path, for applying a selected force to the pressure responsive member in response to a pressure of the pressurized fluid and for permitting flow of a first portion of the pressurized fluid along the communciation path when the selected force exceeds the predetermined force, the first means further impeding flow of the pressurized fluid along the communication path when the selected force is less than the predetermined force; and
   second means, coupled to the communication path, for providing an overpressure path for a remaining portion of the pressurized fluid in reponse to communication of the first portion of the pressurized fluid along the communication path.

2. The pressure relief system of claim 1 wherein the pressure responsive member comprises a buckling pin.

3. The pressure relief system of claim 1, wherein the first means comprises a piston slidable within a housing, wherein the pressurized fluid bears against a first side of the piston and a second side of the piston bears against the pressure responsive member.

4. The pressure relief system of claim 3 wherein the housing comprises a port in communication with the fluidic communication path, wherein the piston isolates the pressurized fluid fro the port when the selected force is less than the predetermined force, and wherein the piston slides to expose the port to the pressurize fluid when the selected force exceeds the predetermined force.

5. The pressure relief system of claim 1 wherein the second means comprises a rotary actuator assembly having a housing in which at least one slider is slidingly moveable form a retracted positioin to an extended position in response to introduction of the first portion of the pressurized fluid into the acutator assembly housing.

6. The pressure relief system of claim 5 wherein the at least one slider comprises a rack that engages a pinion mounted to an actuator shaft, and wherein the movement of the slider to an extended position induces rotation of the actuator shaft.

7. The pressure relief system of claim 6 wherein the second means further comprises a valve accembly coupled to the actuator shaft, wherein rotation of the actuator shaft moves the valve assembly to an open position or a closed position.

8. The pressure relief system of claim 7 wherein the valve assembly comprises a ball valve.

9. The pressure relief system of claim 6, wherein the first portion of the pressurized fluid comes into contact with the rack and pinion.

10. The pressure relief system of claim 6 wherein the first portion of the pressurized fluid is isolated from the rack and pinion.

11. A pressure relief system for detecting and abating an overpressure condition in a pressurized fluid, comprising:
    a fluidic communication path;
    a pressure response assembly coupled to the communication path and comprising a housing having a port in communciation with the communication path, a piston slidable within the housing and a pressure responsive member supported by the piston and configured to mechanically fail when a predetermined force is applied to the pressure responsive member, wherein the piston applies a selected force upon the pressure responsive member in response to introduction of the pressurized fluid into the housing, and wherein the piston moves to a first extended positon when the selected force exceeds the predetermined force and allows ingress of a portion of the pressurized fluid through the port and into the communciation path;
    an actuator assembly coupled to the communication path and comprising a second housing in which at least one slider is disposed, the slider configured to move to a second extended position in response to introduction of the first portion of the pressurized fluid into the housing; and
    a valve assembly coupled to the actuator assembly which establishes an overpressure path for remaining portions of the pressurized fluid in response to movement of the at least one slider to the second extended position.

12. The pressure relief system of claim 11 wherein the actuator assembly further comprises a pinion affixed to an actuator shaft and the at least one slider comprises a rack that engages the pinion.

13. The pressure relief system of claim 11, wherein the pressure responsive member comprises a buckling pin which is compressively loaded by the piston along an axial length of the pin.

14. The pressure relief system of claim 11 wherein the valve assembly comprises a ball valve.

15. An apparatus comprising:
    a pressure responsive member communicating with and maitaining a fluid restraint member positioned adjacent a pressurized fluid of predetermined pressure; and
    a rotary actuator assembly comprising a slider detached from the pressure responsive member, wherein the slider is repositioned by the pressurized fluid when the pressurized fluid imparts sufficient force against the fluid restraint member to permanently alter the mechanical configuration of the pressure responsive member.

16. The apparatus of claim 15, further coprising a bypass valve assembly communicating with the rotary assembly, wherein the bypass valve asembly comprises a valve shaft configured for interaction with the slider, and a valve attached to the valve shaft which redirects a flow of the pressurized fluid in response to the repositioning of the slider by the pressurized fluid.

17. The apparatus of claim 15, wherein the fluid restarint member is a position constrained by a housing, and in which the piston is configured to slide within said housing.

18. The apparatus of claim 15, wherein the pressure responsive member is constrained by a housing, and wherein the pressurized fluid adjacent the fluid restraint member is provided by a conduit commununciating with the housing.

19. The apparatus of claim 18, wherein the rotary actuator assembly further comprising an actuator assembly housing formed by a body portion cooperating with a flange, wherein the actuator assembly housing supports the slider, and wherein the pressurized fluid repositions the slider from a retracted position to an extended position in response to an introduction of pressurized fluid into the housing by a communication path interposed between the housing and the actuator assembly housing.

20. The apparatus of claim 19, further comprising a bypass valve assembly communicating with the rotary actuator assembly, wherein the bypass valve assembly comprises a valve shaft configured for interaction with the slider, and a valve attached to the valve shaft which redirects a flow of the presssurized fluid in response to the repositioning of the slider from the retracted position to the extended position.

* * * * *

UNITED STATES PATENT AND TRADEMARK OFFICE
CERTIFICATE OF CORRECTION

PATENT NO. : 6,843,265 B2
DATED : January 18, 2005
INVENTOR(S) : Julian S. Taylor It is certified that error appears in the above-identified patent and that said Letters Patent is hereby corrected as shown below:

Column 7,
Line 13, replace "coprising" with -- comprising --.
Line 20, replace "restarint" with -- restraint --.

Signed and Sealed this

Twelfth Day of July, 2005

JON W. DUDAS
*Director of the United States Patent and Trademark Office*